Dec. 8, 1953

P. T. MARTIN 2,661,581

APPARATUS AND METHOD FOR SURFACING
GLASS SHEETS AND PLATES

Filed July 18, 1947

Inventor
Philippe Torieux Martin
By
Attorney

Dec. 8, 1953          P. T. MARTIN                2,661,581
              APPARATUS AND METHOD FOR SURFACING
                    GLASS SHEETS AND PLATES
Filed July 18, 1947                           2 Sheets-Sheet 2

Patented Dec. 8, 1953

2,661,581

UNITED STATES PATENT OFFICE 2,661,581

APPARATUS AND METHOD FOR SURFACING GLASS SHEETS AND PLATES

Philippe Tommy Martin, Paris, France, assignor to Societe Anonyme des Manufactures des Glaces & Produits Chimiques De Saint-Gobain, Chauny & Cirey, Paris, France, a corporation Application July 18, 1947, Serial No. 761,937
In France August 10, 1944

Section 1, Public Law 690, August 8, 1946
Patent expires August 10, 1964

30 Claims. (Cl. 51—110)

This invention has for its object to provide such an arrangement of identical polishing units that they collectively will act with substantial uniformity on a strip of glass moving therebelow and supported by one or more travelling beds or tables (not shown) according to the well-known practice in the art. It embodies the usual plurality of revolving frames, under which the glass strip passes in succession, each frame carrying revolving polishing heads. The uniformity of action on the glass by my improvement on this conventional arrangement is secured by having the frames successively acting on any longitudinal area of the glass strip pivoted to move around points differing in the successive units in their distance from the center line of glass worked thereby, so as to compensate for the inequalities in the work diagram of each unit. In my improved apparatus, the polishing units are identical in that sense that they have the same number of identical frames, each frame carrying the same number of rotary heads of the same outer diameter and all operating at the same radius.

My invention further consists in using on the polishing heads annular pads which have the advantage of being automatically cleaned by their scraping on the edges of the strip of glass when they overhang them.

As these heads more or less overhang the edges of the strip of glass according to the distance of the center of their frame from the centerline of glass worked thereby, I use more or less hollowed annular pads; the heads of extensive overhang being furnished with pads having small recesses or cavities, and vice versa.

Referring to the accompanying drawings, in which corresponding parts are designated by corresponding letters of reference, Figure 1 is a diagrammatic plan view of an embodiment of my invention showing the use in each unit of two frames arranged in pairs, one on each side of the axis of the moving glass strip.

While I use the term "polishing" it will be understood that "grinding" or "smoothing" may be substituted therefor without departing from this invention.

In the several figures, E represents polishing heads mounted to rotate around centers carried on the ends of arms $f$ forming the spider frames $B'$, $B^2$, $C'$, $C^2$, etc., rotating around centers $b'$, $b^2$, etc., $c'$, $c^2$, etc. V represents a glass strip moving lengthwise under the polishing heads, $x$—$x$ being the medial line or axis of the strip. The heads carry on their lower surfaces pads $p$ and they and the frames may be rotated around their centers in any well known manner.

Figure 1:
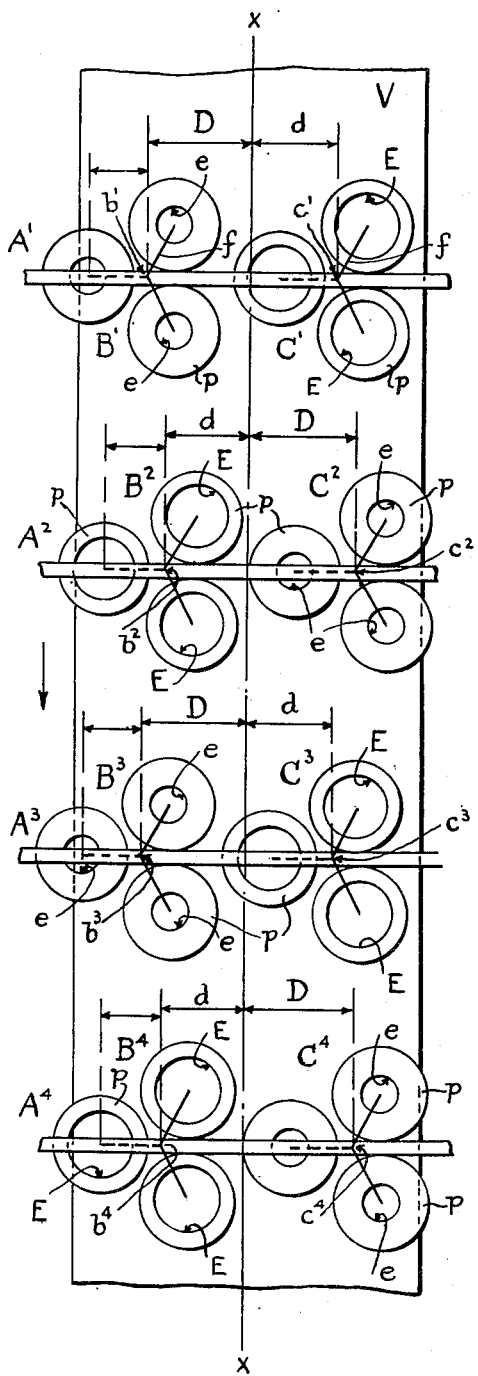
Figure 2:
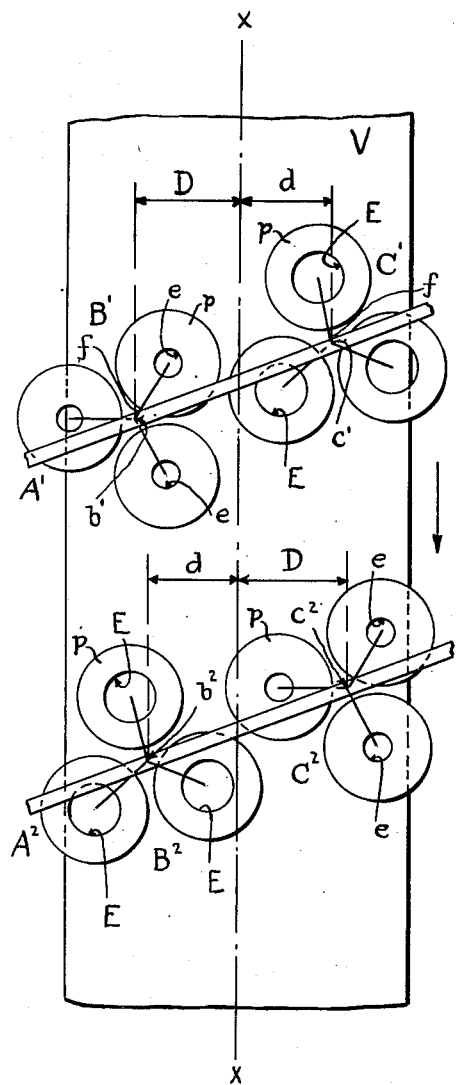
Figure 2 is a similar view with the two frames of each unit being arranged in echelon.
Figure 3:
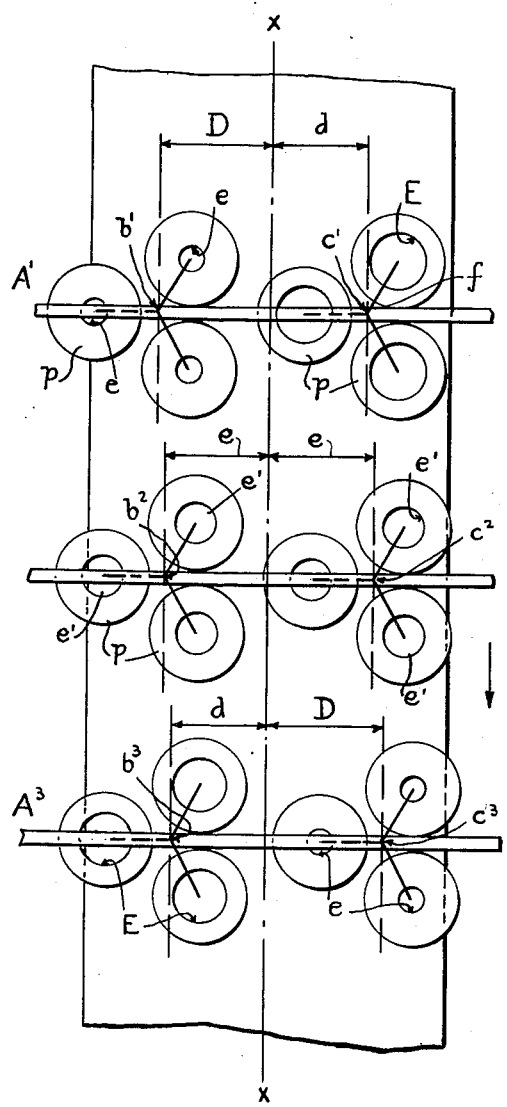
Figure 3 is a view similar to Figure 1, the pivot points of the frame of three successive units being progressively shifted laterally in respect to the center line of the glass strip.

In Figures 1 and 3 the frames are mounted on cross beams $A'$, $A^2$, etc. transverse to the axis of the strip, while in Figure 2 the beams are oblique thereto, thus placing the frames carried thereby in echelon. As shown in Figures 1, 2 and 3, two frames are carried by each beam, one on each side of the axis $x$—$x$ of the glass strip.

In Figures 1 and 2 which correspond to a case in which the desired compensation of the work performed is obtained by two successive units of two frames each the centers $b'$, $c'$, $b^2$, $c^2$, etc. of the frames carried by each beam are at different distances D—$d$ from the axis $x$—$x$ so that the pivots of the two frames are asymmetrical to the said axis, the asymmetry being reversed as between adjacent pairs and the distances D—$d$ etc. of each pair of frames or unit being such that the maxima of the work performed by one unit correspond to the minima of the work performed by the other unit.

The pads, on the rotation of their carrying frames and polishing heads will overhang at times the edges of the strip as is shown, and to facilitate the scraping off the abrasive therefrom they are of annular form having a cutout center $e$, $E$, the diameter of which depending from the overhang of its head. Thus each pad on its rotation in moving back to a position entirely over the glass strip will be entirely scraped by the edge of the sheet.

In Figure 3 which illustrates an apparatus in which the compensation of the work diagrams is obtained by three successive units, the centers $b'$, $c'$, $b^2$, $c^2$, $b^3$, $c^3$, of the three successive frames are progressively shifted laterally in one direction in respect to the axis $x$—$x$. Thus the center $b'$ of the left hand upper frame is at a greater distance D from the axis $x$—$x$ than the center $c'$ of the corresponding right hand frame, which is at the distance $d$ of the said axis, while the centers of the next lower pair are at the same distance $e$, $e$ from the axis $x$—$x$, and the center $b^3$ of the left hand lower frame is closer to the axis $x$—$x$ than the center $c^3$ of the right hand frame, their distances from the axis $x$—$x$ being $d$ and D respectively. The cavities E, $e$ of the pads are unequal according to the distance D, $d$, above mentioned.

For polishing a wide glass strip, each beam can carry a plurality of polishers. In that case, the first and the last polisher of each beam are secured with annular pads, the pads of the other polishers are not annular.

Figure 4:
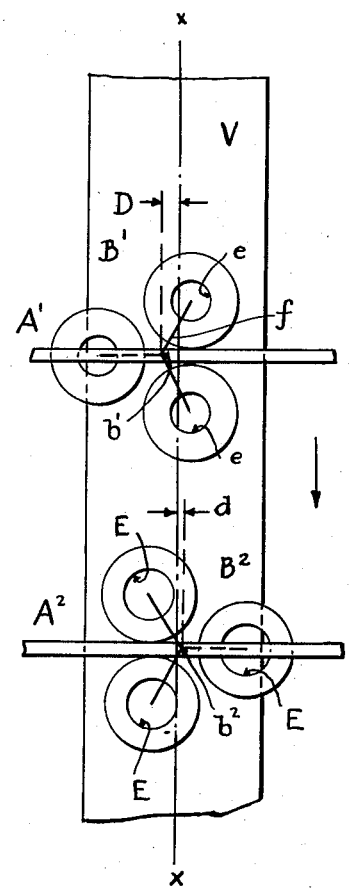
Figure 4 shows my invention as embodied in an arrangement in which only one frame is used in lieu of the two shown in Figures 1, 2 and 3.

In Figure 4 instead of using frames in pairs as in the other figures I have shown how my invention may be used with a succession of single identical frames, the heads of which are capable of sweeping over the whole sheet. Here the center $b'$ of the upper frame is on the left of the axis of the center $x$—$x$ while the center $b^2$ of the adjacent lower frame is on the right of such axis.

Moreover, more than three successive units can be used if it is necessary for obtaining the desired compensation of the work performed.

In each of the forms shown it will be seen that the centers of rotation of corresponding adjacent frames are shifted laterally to different degrees in respect to the axis $x$—$x$ so that the polishing heads on such frames do not track on their work on the strip although their frames are of identical construction and proportions.

This lends itself to economy of construction, as it is evident that the displacements of the centers before described may be accomplished by merely shifting the centers of rotation of the identical revolving frames lengthwise on the beams $A'$, $A^2$ and $A^3$.

Within the scope of this invention the work of polishing can be either with a uniform pressure applied to each pad, or with uneven pressures which are obtained, for example, by applying the same load to each polisher head, irrespective of the dimensions of the cavity of its pad.

This invention can be applied not only to the continuous polishing of a strip of glass continuously under the successive units, but also to the polishing of a glass sheet of limited length which is moved under the polishers in intermittent fashion, for example with a reciprocatory motion.

Having thus described my invention, what I claim and desire to secure by United States Letters Patent is:

1. In apparatus for the surfacing of glass sheets or plates, the combination of a bed for the glass sheet to be surfaced, said bed being adapted to travel in a rectilinear path during said surfacing, a frame mounted above the bed and revoluble about an axis displaced from the longitudinal center line of said bed, another frame mounted above the bed and revoluble about an axis displaced oppositely from that of the first named frame and at a distance varying from that of the axis of the first named frame from said center line, and a plurality of annular polishing heads provided with radial glass working surfaces of uniform diameter carried by said frames and revoluble about axes equidistant from the axes of the frames and located to move each head seriatim in the revolution of the frames partially beyond the longitudinal edges of the glass sheet supported by said bed.

2. In apparatus for the surfacing of glass sheets or plates, the combination of a bed for the glass sheet to be surfaced, said bed being adapted to travel in a rectilinear path during said surfacing, a frame mounted above the bed and revoluble about an axis displaced from the longitudinal center line of said bed, another frame mounted above the bed and revoluble about an axis displaced oppositely from that of the first named frame and at a distance varying from that of the axis of the first named frame from said center line, a plurality of annular polishing heads provided with radial glass working surfaces of uniform diameter carried by said frames and revoluble about axes equidistant from each other located to move each head seriatim in the revolution of the frame partially beyond the longitudinal edges of the glass sheet supported by said bed.

3. In apparatus for the surfacing of glass sheets or plates, the combination of a bed for the glass sheet to be surfaced, said bed being adapted to travel in a rectilinear path during said surfacing, a frame mounted above the bed and revoluble about an axis displaced from the longitudinal center line of said bed, another frame mounted above the bed and revoluble about an axis displaced oppositely from that of the first named frame and at a distance varying from that of the axis of the first named frame from said center line, a plurality of annular polishing heads provided with radial glass working surfaces of uniform diameter carried by said frames and revoluble about axes equidistant from each other and from the axis of the frame located to move each head seriatim in the revolution of the frame partially beyond the longitudinal edges of the glass sheet supported by said bed.

4. In apparatus for the surfacing of glass sheets or plates, the combination of a bed for the glass sheet to be surfaced, said bed being adapted to travel in a rectilinear path during said surfacing, a frame mounted above the bed and revoluble about an axis displaced from the longitudinal center line of said bed, another frame mounted above the bed and revoluble about an axis displaced oppositely from that of the first named frame and at a distance varying from that of the axis of the first named frame from said center line, and a plurality of annular polishing heads provided with radial glass working surfaces carried by each frame and revoluble about axes equidistant from the axis of the frame located to move each head seriatim in the revolution of the frame partially beyond the longitudinal edges of the glass sheet supported by said bed, the heads of one frame having uniform diameters and apertures and the heads of the other frame having the same diameter with apertures varying in size from those of said first named frame.

5. In apparatus for the surfacing of glass sheets or plates, the combination of a bed for the glass sheet to be surfaced, said bed being adapted to travel in a rectilinear path during said surfacing, a plurality of frames revolubly mounted above the bed, a plurality of annular polishing heads provided with radial glass working surfaces of the same diameter carried by said frames and revoluble about axes equidistant from the frames, the apertures in the heads of one frame being smaller than the apertures in the heads of the other frame, the axes of said frames being positioned with respect to the longitudinal center line of the bed whereby upon rotation of the frames, the polishing heads having the smaller apertures will overhang the edge of the glass sheet supported by said bed to an extent greater than the heads having the larger apertures carried by another frame.

6. In apparatus for the surfacing of glass sheets or plates, the combination of a bed for the glass sheet to be surfaced, said bed being adapted to travel in a rectilinear path during said surfacing, a plurality of polishing units arranged in succession, each unit comprising a plurality of frames mounted above the bed and arranged transversely to the center line of said bed and revoluble about axes offset asymmetrically from said center line with the frames of a succeeding unit reversely arranged to those of a preceding unit with respect to said center line of the bed, a plurality of annular polishing heads of the same outside diameter provided with radial glass working surfaces carried by said frames and revoluble about axes equidistant from the axes of said frames, the axis of the frame nearest an edge of the sheet being located so as to translate each polishing head seriatim partially beyond the edge of the sheet supported by said bed.

7. In apparatus for the surfacing of glass sheets or plates, the combination of a bed for the glass sheet to be surfaced, said bed being adapted to travel in a rectilinear path during said surfacing, a plurality of successive units each including a plurality of identical frames revolubly mounted above the bed, the axes of the frames of one unit being disposed on opposite sides of the center line of the bed and asymmetrically disposed in respect to said center line and the axes of the frames of a succeeding unit located in reversed and asymmetrical arrangement to that of the frames of the first unit and to the center line of the bed, a plurality of annular polishing heads provided with radial working surfaces of uniform diameter carried by the frames of said units and revoluble about axes equidistant from the axes of the frames, the axes of the frames of the units and the axes of their respective polishing heads being so positioned and correlated that all heads in their revolution about the axes of the frames move partially beyond an edge of the glass sheet supported by said bed.

8. In apparatus for the surfacing of glass sheets or plates, the combination of a bed for the glass sheet to be surfaced, said bed being adapted to travel in a rectilinear path during said surfacing, a plurality of successive units each including a plurality of identical frames revolubly mounted above the bed, the axes of the frames of one unit being disposed on opposite sides of the center line of the bed and asymmetrically disposed in respect to said line and the axes of the frames of a succeeding unit located in reversed and asymmetrical arrangement to that of the frames of the first unit and to the center line of the bed, each of said frames carrying rotatable annular polishing heads spaced apart of which the axes are parallel to the axes of the frames and equidistant therefrom, the heads on said frames being adapted to operate on the surface of the glass sheet, the heads on all frames being identical in diameter with the apertures of the heads individual to one frame varying in size to the apertures of the heads individual to another frame, the polishing heads of all frames extending beyond the adjacent edges of the sheet.

9. In apparatus for the surfacing of glass sheets or plates, the combination of a bed for the glass sheet to be surfaced, said bed being adapted to travel in a rectilinear path during said surfacing, a plurality of identical frames mounted above the bed and revoluble about axis displaced from the center line of the bed, each frame carrying rotatable annular polishing heads spaced apart of which the axes are parallel to the axes of the frames and equidistant therefrom, the heads on said frames being adapted to operate on the surface of the glass, the heads on all frames being identical in diameter with the area of the heads of one frame varying from the area of the heads of another frame, the polishing heads including the apertures of one frame extending beyond one edge of the glass sheet supported by the bed and the heads including the apertures thereof on another frame extending beyond the other edge of the glass sheet.

10. In apparatus for the surfacing of glass sheets or plates, the combination of a bed for the glass sheet to be surfaced, said bed being adapted to travel in a rectilinear path during said surfacing, a plurality of identical frames mounted above the bed and revoluble about axes displaced from the center line of the bed, each frame carrying rotatable annular polishing heads spaced apart of which the axes are parallel to the axes of the frames and equidistant therefrom, the heads on said frames being adapted to operate on the surface of the glass sheet, the heads on all frames being identical in diameter with the area of the heads of one frame varying from the area of the heads of another frame, the polishing heads of one frame extending beyond one edge of the glass sheet supported by the bed and the heads on another frame extending beyond the other edge of the glass sheet supported by the bed.

11. The invention set forth in claim 6 wherein the polishing units are arranged obliquely with respect to the center line of the bed.

12. The invention set forth in claim 7 wherein the polishing units are arranged obliquely with respect to the center line of the bed.

13. The invention set forth in claim 8 wherein the polishing units are arranged obliquely with respect to the center line of the bed.

14. In apparatus for the surfacing of glass sheets or plates, the combination of a bed for the glass sheet to be surfaced, said bed being adapted to travel in a rectilinear path during the surfacing of the glass sheet, a plurality of revoluble polishing frames above said bed arranged in succession with their axes differently disposed with respect to the center line of the bed, a plurality of annular polishing heads of the same outside diameter carried by each frame in surfacing relation to the glass sheet on said bed, said heads in the revolution of the frames travelling partially beyond the edge of the sheet, the axis of any one of successive frames being displaced laterally from that of an immediately preceding frame, said lateral displacement being in respect to the center line of the bed, the inside diameter of the annular polishing heads on the frame furtherest displaced laterally from the center line of the bed being smaller than the inside diameters of the annular polishing heads of the frame having a lesser lateral displacement from said center line.

15. The method of surfacing a sheet or ribbon of glass which includes advancing a sheet of glass in a linear path and subjecting the sheet while travelling to the surfacing action of a plurality of groups of annular surfacing heads of uniform outside diameter travelling in a closed path about axes disposed asymmetrically with respect to the median line of the sheet and compensating for unevenness in the surface of the sheet occasioned by said surfacing heads by subjecting the advancing sheet so surfaced to succeeding groups of surfacing heads of the same outside diameter as the heads of the first named groups travelling in common closed paths about axes displaced differently from the axes of said first named groups and from the median line of the sheet, the surfacing heads of all groups in their travel about their respective axes partially extending beyond the edge of the sheet.

16. The method of surfacing a sheet or ribbon of glass, which includes advancing a sheet of glass in a linear path and subjecting the sheet while travelling to the surfacing action of a plurality of groups of annular surfacing heads of uniform outside diameter with the apertures in one group of heads varying in diameter with the apertures of another group of heads travelling in a closed path about axes disposed asymmetrically with respect to the median line of the sheet and compensating for unevenness in the surface of the sheet occasioned by said surfacing heads by subjecting the advancing sheet so surfaced to succeeding groups of surfacing heads of the same outside diameter as the heads of the first named groups travelling in common closed paths about axes displaced differently from the axes of said first named groups and from the median line of the sheet, the surfacing heads of all groups in their travel about their respective axes partially extending beyond the edge of the sheet.

17. The method set forth in claim 16 wherein the apertures in the heads of one group vary in diameter with those in the heads of another group.

18. The method set forth in claim 16 wherein the apertures in the surfacing heads of one group are smaller than the apertures of another group with the group of heads with smaller apertures extending partially beyond the edge of the sheet to a greater extent than those of the group of heads having the larger apertures.

19. The method of surfacing a sheet or ribbon of glass, which includes advancing the sheet of glass in a linear path and subjecting a portion of the sheet while travelling to the surfacing action of a plurality of surfacing units arranged in succession, each unit including a plurality of frames mounted above the glass sheet and arranged transversely to the median line of the glass sheet, said frames rotating about axes offset asymmetrically from said median line, a frame to one side of said median line carrying a plurality of annular surfacing heads of uniform outside diameter and aperture size and a frame at an opposite side of said median line carrying a plurality of annular surfacing heads of the same outside diameter as the first named surfacing heads with apertures varying in size from the apertures of said first named surfacing heads and compensating for any unevenness in the surfacing of the glass sheet by the surfacing heads of the preceding unit by subjecting the surface of the sheet to the surfacing action of a succeeding unit reversely arranged to that of the preceding unit with respect to the median line of the sheet, the surfacing heads of all frames and units in their travel about the axis of their respective frames extending partially beyond the edge of the sheet.

20. The method set forth in claim 19 wherein the surfacing units are arranged obliquely with respect to the median line of the sheet.

21. The method of surfacing a sheet or ribbon of glass which includes placing the sheet horizontally and moving it in the direction of its length under a series of fixed surfacing units extending across the face of the sheet to be surfaced, subjecting the face of the sheet to the surfacing action of each unit which includes a plurality of annular surfacing heads having the same outside diameter travelling about centers disposed asymmetrically in respect to the median line of the sheet, the distance between the centers about which the annular surfacing heads travel being the same in all units, and compensating for unevenness in the surfacing action upon the face of the sheet by the annular heads of a preceding unit by subjecting the said uneven face of the glass sheet to the surfacing action of the annular heads of a succeeding unit travelling about centers arranged differently in respect to the median line of the glass sheet from the centers of travel of a preceding unit.

22. The method set forth in claim 21 wherein the annular surfacing heads during their travel over the face of the glass sheet pass partially beyond the edges thereof.

23. The method set forth in claim 21 wherein the annular surfacing heads during their travel over the face of the glass sheet pass partially beyond the edges thereof, the several units being arranged obliquely with respect to the median line of the sheet.

24. The method set forth in claim 21 wherein the surfacing heads of the units are translated bodily in a circular path.

25. The method set forth in claim 21 wherein the annular surfacing heads of the units are located so as to travel over the face of the glass sheet and pass partially beyond the edges thereof, and wherein several of the annular surfacing heads are provided with apertures of larger diameter moving partially beyond the edges of the glass sheet to a lesser extent than heads having apertures of smaller diameter.

26. The method of surfacing a sheet or ribbon of glass which includes advancing the sheet of glass in a linear path and subjecting a portion of the sheet while travelling to the surfacing action of a plurality of rotating frames arranged in succession each carrying a plurality of annular surfacing heads of the same outside diameter, said surfacing heads in the revolution of the frames travelling at times beyond the edge of the sheet, the axis of a preceding frame being located at a side of the median line of the sheet and with apertures in the heads carried by said frame of the same diameter and the axis of a succeeding frame located at a side of the median line of the sheet at a distance with said median line varying from the distance of said preceding frame from said median line, and with apertures in the heads of said succeeding frame having a uniform diameter varying with the diameter of the apertures of said preceding frame, the axis of the frame carrying the surfacing heads with the apertures of smaller diameter being spaced a distance greater from the median line of the sheet than the axis of the frame carrying the surfacing heads with the apertures of larger diameter, the surfacing action of a succeeding frame with its surfacing heads so constructed and positioned compensating for the unevenness of the surfacing action of a preceding frame and its surfacing heads.

27. In apparatus for the surfacing of glass sheets or plates, the combination of a bed for the glass sheet to be surfaced, said bed being adapted to travel in a rectilinear path during said surfacing, a plurality of polishing units arranged in succession, each unit including at least one frame mounted above the bed and revoluble about an axis offset to one side of the longitudinal center lines of the bed with at least one frame of a succeeding unit asymmetrically arranged with respect to at least one frame of a preceding unit, a plurality of annular polishing heads of the same outside diameter provided with radial glass working surfaces carried by said frames and revoluble about axes equidistant from the axes of said frames, said heads, in the revolution of the frames, moving partially beyond the edges of the sheet supported by the bed.

28. The method of surfacing a sheet or ribbon of glass which includes advancing a sheet of glass in a linear path and subjecting the sheet while travelling to the surfacing action of at least one group of annular surfacing heads of uniform outside diameter travelling in a closed path about an axis disposed to one side of the median line of the sheet and compensating for unevenness in the surfacing of the sheet occasioned by said surfacing heads by subjecting the advancing sheet so surfaced to a further surfacing by at least one group of surfacing heads of the same outside diameter as the heads of the first named group travelling in a closed path about an axis displaced differently from the axis of said first named group and from the median line of the sheet, the surfacing heads of all groups in their travel about their respective group axes partially extending beyond the edge of the sheet.

29. In apparatus for the surfacing of glass sheets or plates, the combination of a bed for the glass sheet to be surfaced, said bed being adapted to travel in a rectilinear path during the glass surfacing operation, a plurality of revoluble polishing frames above said bed arranged in succession with their axes differently disposed with respect to the center line of the bed, a plurality of annular polishing heads of the same outside diameter carried by each frame in surfacing relation to the glass sheet carried by said bed, said heads in the revolution of the frame travelling partially beyond the edge of the glass sheet, the axis of a preceding frame being located to one side of the center line of the bed, the polishing heads carried by said preceding frame being provided with apertures of uniform diameter, and the axis of a succeeding frame located asymmetrically with respect to a preceding frame and the center line of the bed, the polishing heads of the succeeding frame being provided with apertures of uniform diameter varying with the diameter of the apertures of the heads of a preceding frame.

30. The method of surfacing a sheet or ribbon of glass which includes advancing the sheet of glass in a linear path and subjecting a portion of the sheet while travelling to the surfacing action of a group of annular surfacing heads of uniform outside diameter travelling in a common closed path about an axis displaced to one side of the median line of the sheet, subjecting another and substantially opposite portion of the sheet to the surfacing action of another group of annular surfacing heads of the same diameter as the heads of the first mentioned group travelling in a common closed path about an axis displaced substantially opposite from the axis of the first named group and at a distance varying from that of the first named axis from the median line of the sheet, the surfacing heads of all groups in their travel about their respective axes moving partially beyond the edge of the sheet and subjecting the portion of the sheet so surfaced by said annular surfacing heads to a further surfacing action of a succeeding and similar group of surfacing heads reversely arranged with respect to the median line of the sheet, whereby unevenness of the surface of the glass sheet produced by said first named groups of heads is compensated by the unevenness of the surface of the glass sheet produced by a succeeding group of heads.

PHILIPPE TOMMY MARTIN.

References Cited in the file of this patent

UNITED STATES PATENTS

| Number | Name | Date |
|---|---|---|
| 1,684,029 | Howard | Sept. 11, 1928 |
| 1,698,365 | Hitchcock | Jan. 8, 1929 |
| 1,724,703 | Fox | Aug. 13, 1929 |
| 1,803,752 | Ford | May 5, 1931 |
| 1,824,347 | Hibon | Sept. 22, 1931 |
| 1,833,359 | Fox et al. | Nov. 24, 1931 |
| 1,895,908 | Blair | Jan. 31, 1933 |
| 2,285,318 | Waldron | June 2, 1942 |
| 2,420,989 | Waldron | May 20, 1947 |

FOREIGN PATENTS

| Number | Country | Date |
|---|---|---|
| 15,439 | Holland | Nov. 15, 1926 |